(12) United States Patent  
Liang (10) Patent No.: US 8,252,444 B2
(45) Date of Patent: Aug. 28, 2012

(54) PORTABLE ELECTRONIC DEVICE WITH BATTERY COVER

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 298 days.

(21) Appl. No.: 12/753,121

(22) Filed: Apr. 2, 2010

(65) Prior Publication Data

US 2011/0129713 A1    Jun. 2, 2011

(30) Foreign Application Priority Data

Nov. 30, 2009 (CN) .................. 2009 2 0316198 U (51) Int. Cl.
*H01M 2/10* (2006.01)
(52) U.S. Cl. ............... 429/97; 312/326; 361/679.58; 429/100

(58) Field of Classification Search ............. 429/97, 429/100; 312/326; 361/679.58
See application file for complete search history.

(56) References Cited

U.S. PATENT DOCUMENTS

| 2007/0048599 A1* | 3/2007 | Choi ............... 429/97 |
| 2008/0076015 A1* | 3/2008 | Tien et al. ............ 429/100 |
| 2009/0246610 A1* | 10/2009 | Shi et al. ............ 429/100 |
| 2010/0167114 A1* | 7/2010 | Tang ............... 429/97 |
| 2011/0020684 A1* | 1/2011 | Liang et al. ............ 429/100 |
| 2011/0181162 A1* | 7/2011 | Xiao ............... 312/326 |

* cited by examiner

*Primary Examiner* — Robert B Davis
(74) *Attorney, Agent, or Firm* — Altis Law Group, Inc.

(57) ABSTRACT

A portable electronic device includes a base defining a battery compartment, a cover, an operating element, a latching element, and an ejecting element. The cover is configured for covering the battery compartment and pivotably attached to the base. The latching element is attached to the cover. The ejecting element attaches to the base. The operating element is slidably attached to the base. The ejecting element resists the latching element to bias the cover to move away from the base when detaching.

15 Claims, 11 Drawing Sheets

PORTABLE ELECTRONIC DEVICE WITH BATTERY COVER

CROSS-REFERENCE TO RELATED APPLICATIONS

This application is related to a co-pending U.S. patent application Ser. No. 12/753.122, entitled "PORTABLE ELECTRONIC DEVICE WITH BATTERY COVER", by ZHI-QIANG, XIAO. Such application has the same assignee as the present application and has been concurrently filed herewith. The above-identified application is incorporated herein by reference.

BACKGROUND

1. Technical Field

The exemplary disclosure generally relates to electronic devices, and particularly to a portable electronic device having a battery cover.

2. Description of Related Art

Batteries are widely used in portable electronic devices, such as personal digital assistants (PDAs), mobile phones, and others. Often, batteries are attachably received in the electronic devices, and battery covers are provided to connect with housings of the electronic devices to secure the batteries. Batteries are replaced by opening the battery covers when, for example, the batteries are damaged and/or dead and/or no longer rechargeable.

Although the battery cover assemblies may be simple, the engagement between the battery cover and the housing of the mobile phone can be too strong to allow easily detachment thereof.

Therefore, there is room for improvement within the art.

BRIEF DESCRIPTION OF THE DRAWINGS

Many aspects of disclosure can be better understood with reference to the following drawings. The components in the drawings are not necessarily drawn to scale, the emphasis instead being placed upon clearly illustrating the principles of the portable electronic device with a latching battery cover. Moreover, in the drawings, like reference numerals designate corresponding parts throughout the several views, in which.

DETAILED DESCRIPTION

Figure 1:
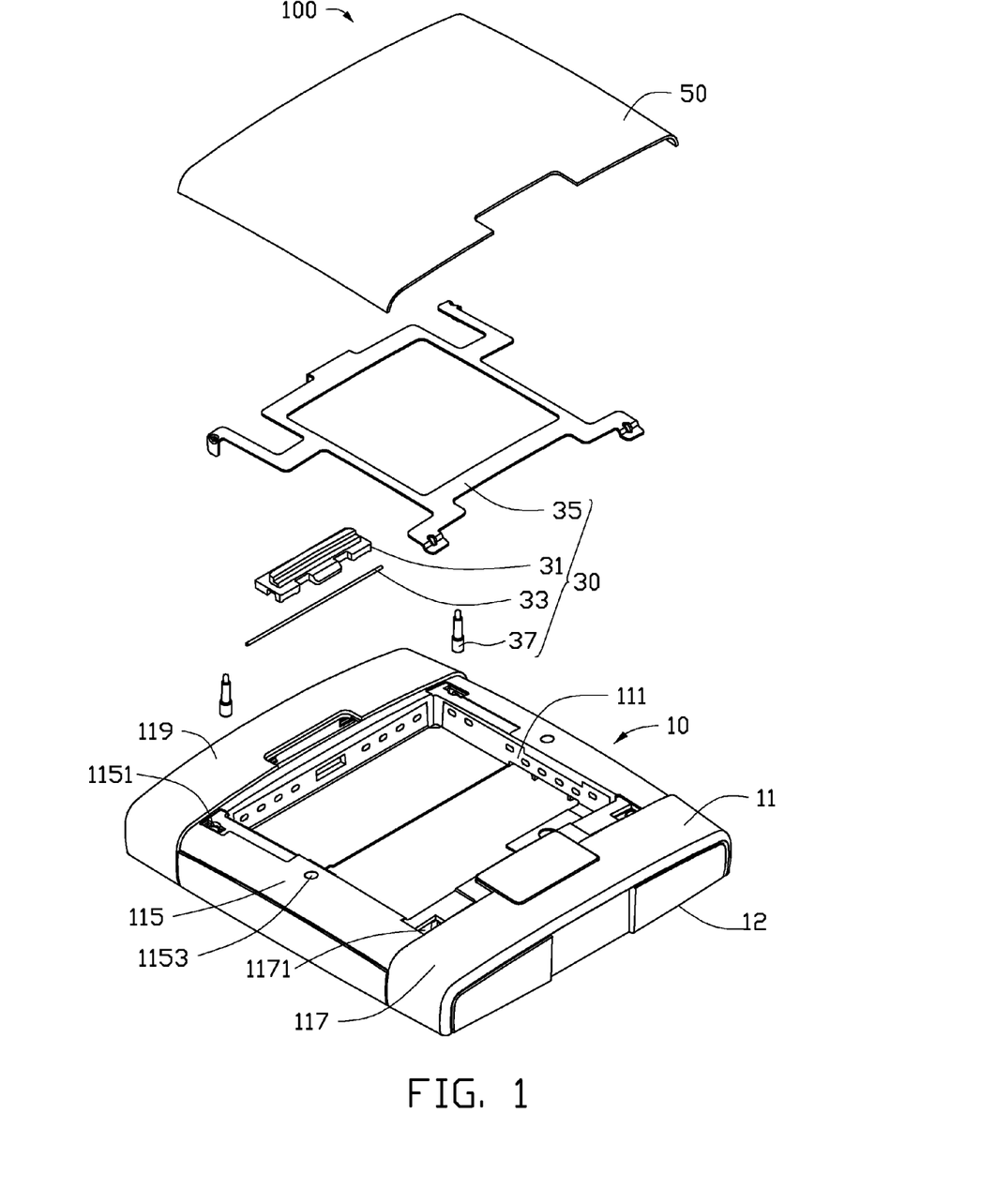
FIG. 1 is an exploded, isometric view of an exemplary embodiment of a portable electronic device.
Figure 2:
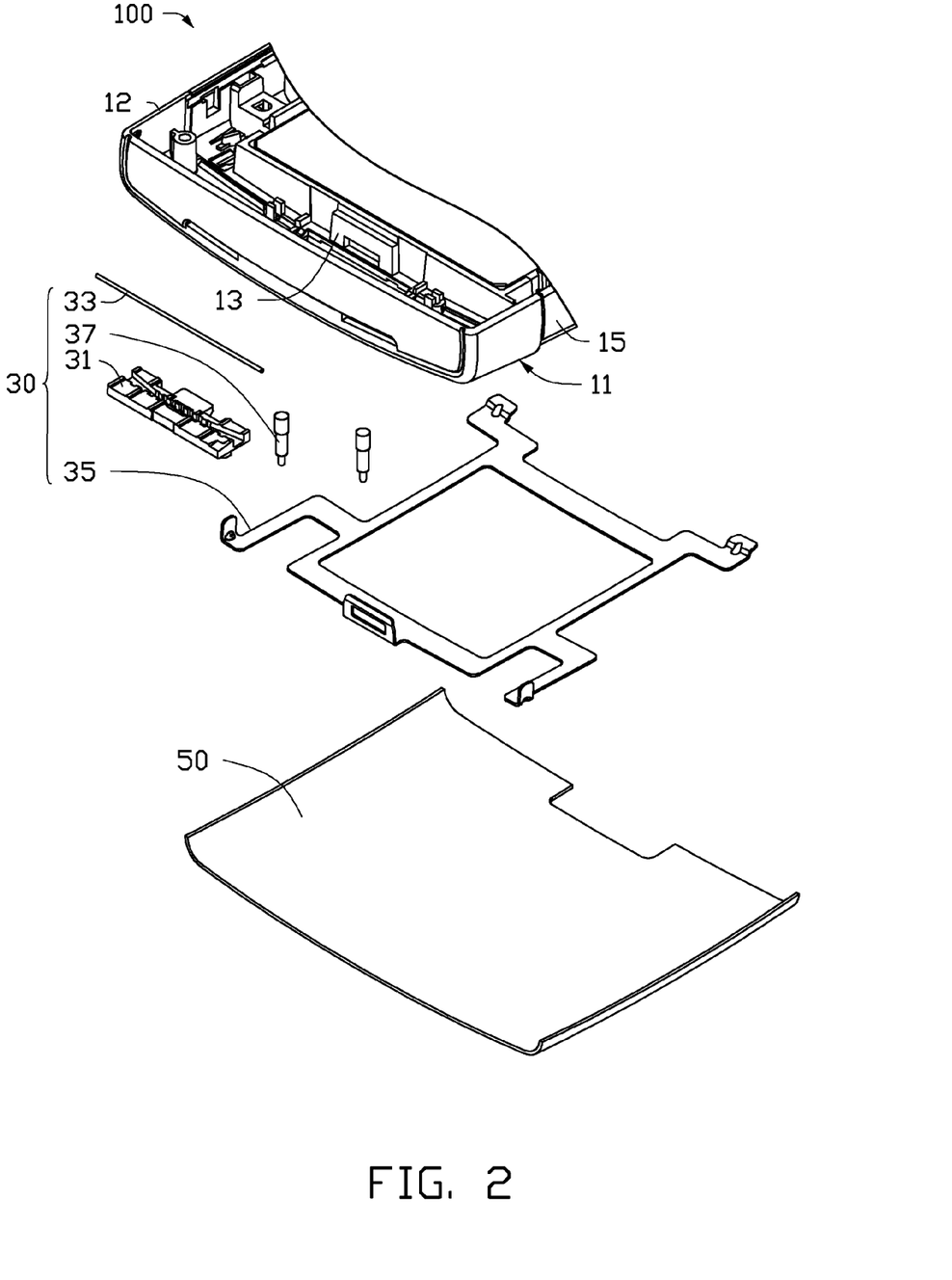
FIG. 2 is similar to FIG. 1, but viewed from another aspect.

FIGS. 1 and 2 show an exemplary embodiment of a portable electronic device 100. The portable electronic device 100 includes a base 10, a latching module 30, and a removable cover 50. The base 10 has a first surface 11 and a second surface 12 opposite to the first surface 11. The base 10 defines a battery compartment 111 in the first surface 11 to receive a battery (not shown). The battery compartment 111 is surrounded by two sidewalls 115, a first end wall 117, and a second end wall 119 opposite to the first end wall 117. The cover 50 covers the battery compartment 111 to secure the battery in the battery compartment 111 and the cover 50 is retained in position by the latching module 30. Each of the two sidewalls 115 defines an opening 1151 adjacent to the second end wall 119 and a chamber 1153 in approximately the middle of the sidewall 115. The first end wall 117 defines two spaced-apart apertures 1171.

Figure 3:
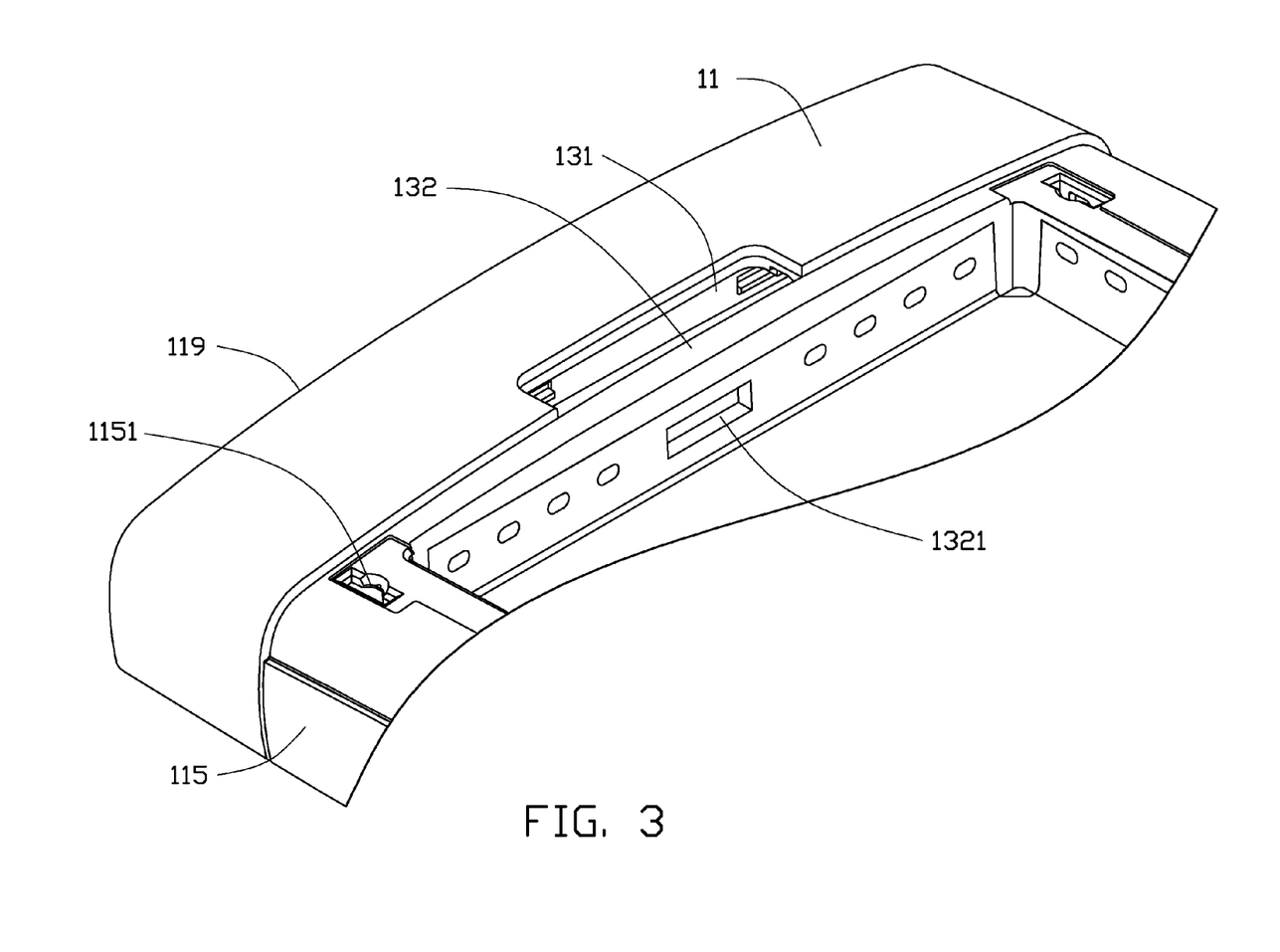
FIG. 3 is an enlarged view showing one portion of a base of the portable electronic device in FIG. 1.
Figure 4:
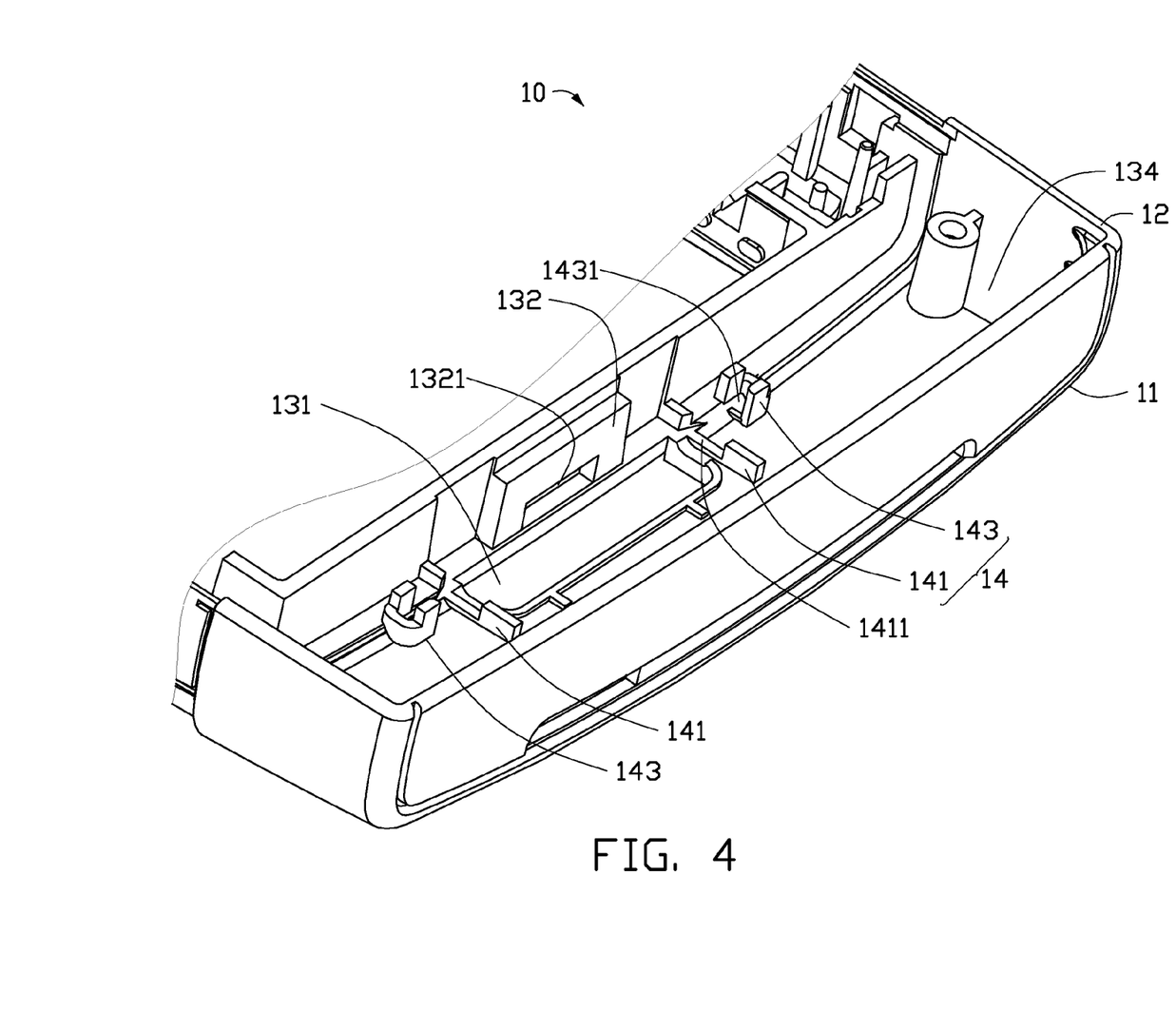
FIG. 4 is similar to FIG. 3, but viewed from another aspect.

Referring to FIG. 3, the base 10 defines a through hole 131 and forms a supporting wall 132 that defines an end of the battery compartment 111. The supporting wall 132 defines a receiving hole 1321. The receiving hole 1321 allows the through hole 131 to communicate with the battery compartment 111. The base 10 defines a space 134 communicating with the through hole 131 as shown in FIG. 4. Two positioning portions 14 extend upwards from a bottom surface of the hollow 134. Each positioning portion 14 has a rib 141 adjacent to the through hole 131, and two blocks 143. Each rib 141 defines a cutout 1411. A slot 1431 is defined between the blocks 143.

Figure 5:
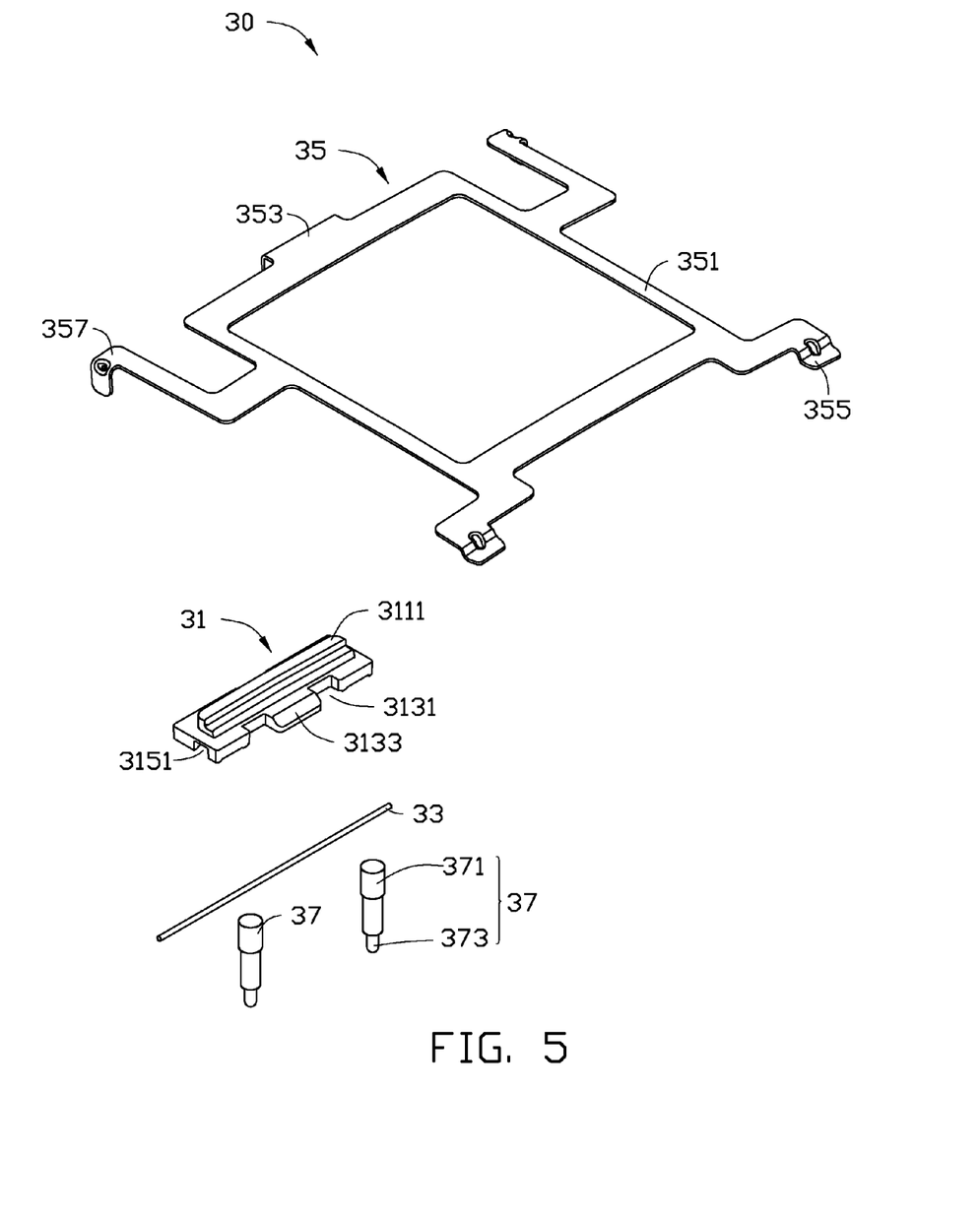
FIG. 5 is an enlarged view of the latching module in FIG. 1.

The latching module 30 includes an operating element 31, an elastic element 33, a latching element 35, and two ejecting elements 37. The operating element 31 has a pressing protrusion 3111 formed on one surface foe pressing, e.g., by a finger, and a curved slit 3151 defined in the opposite surface. Two sidewalls of the curved slit 3151 have a plurality of spaced projections 3153 (shown in FIG. 6) for positioning the elastic element 33. The operating element 31 defines two spaced notches 3131 in a sidewall, and a latching protrusion 3133 formed between the two notches 3131. A width of the latching protrusion 3133 is approximately the same as that of the receiving hole 1321.

Figure 6:
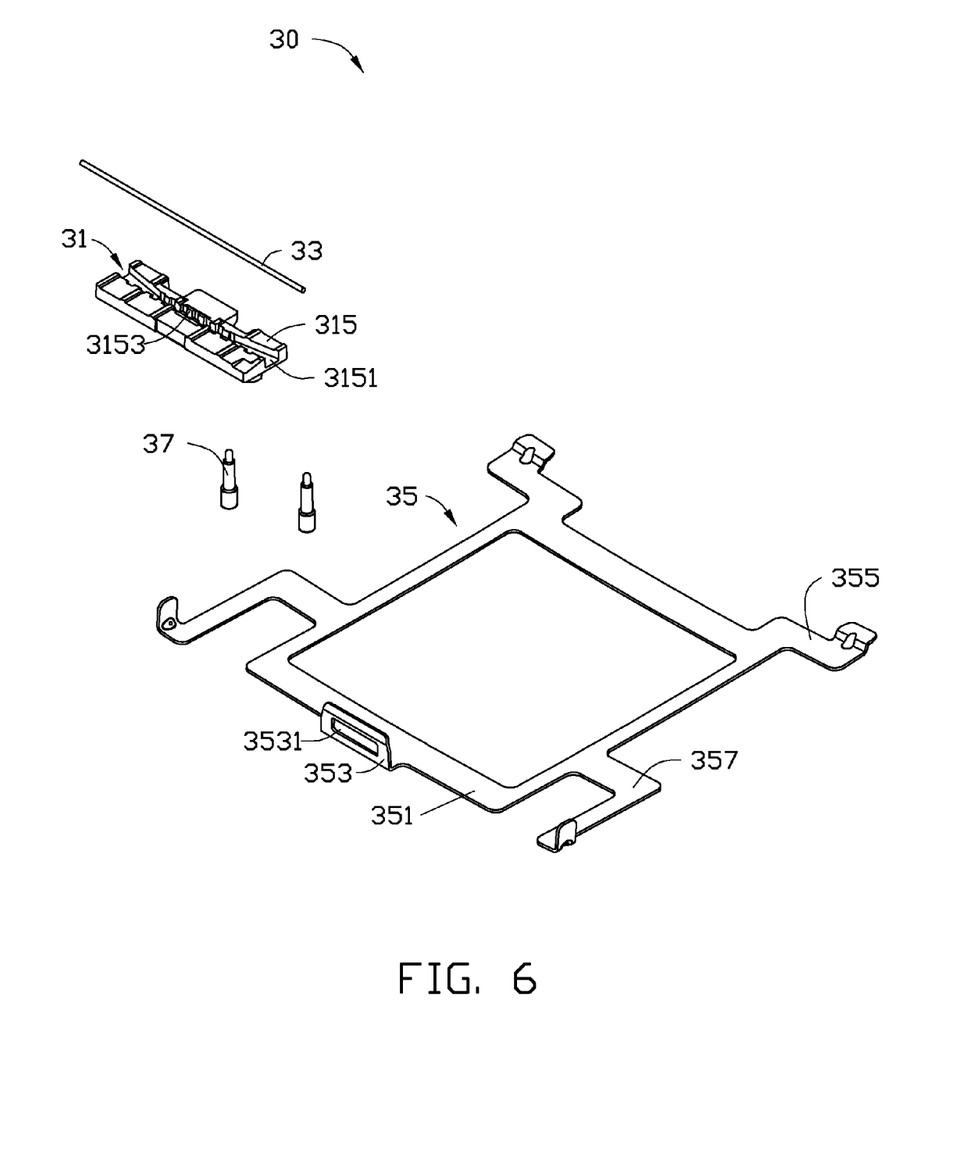
FIG. 6 is similar to FIG. 5, but viewed from another aspect.

Referring to FIG. 6, the elastic element 33 is received in the curved slit 3151. Each end of the elastic element 33 is received in one of the slots 1431. The latching element 35 includes a frame 351. A flange 353 extends from and perpendicular to one end of the frame 351, and two spaced-apart first latching arms 355 extend from the other end of the frame 351. Each of the first latching arms 355 is each received in one of the corresponding apertures 1171. The flange 353 defines a latching hole 3531 that receives the latching protrusion 3133 of the latching element 31. Two sides of the frame 351 each extend a second latching arm 357 received in its corresponding opening 1151.

Referring back to FIG. 5, each of the ejecting elements 37 includes a sleeve 371, and a pin 373. One end of the pin 373 is slidably received in the sleeve 371, and the other end extends out of the sleeve 371. An elastic element (not shown) received in the sleeve 371 and resisting the pin 373 may allow the pin 373 to move relative to the sleeve 371.

Figure 7:
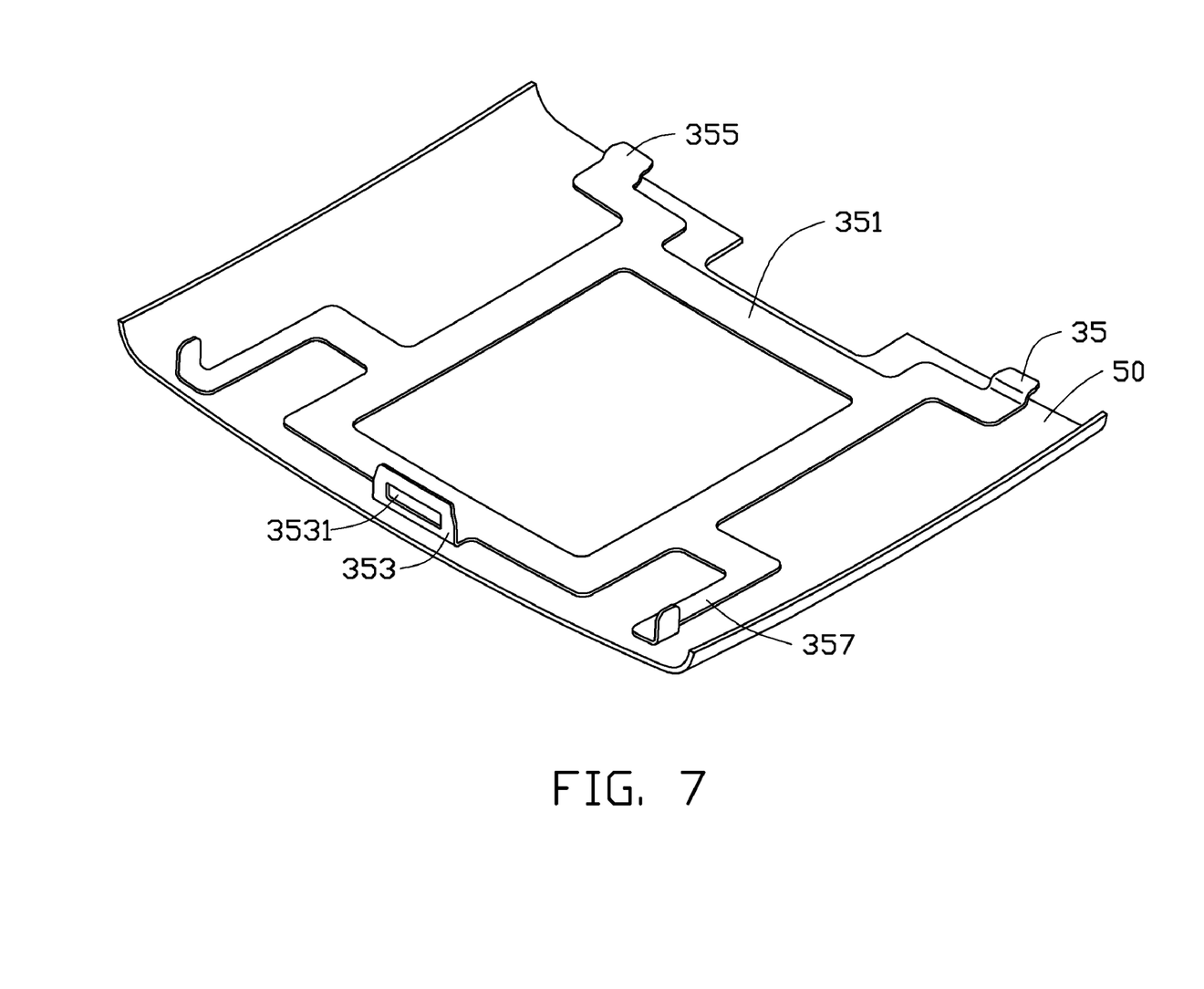
FIG. 7 is an isometric view showing the latching element to be attached to the battery cover.
Figure 8:
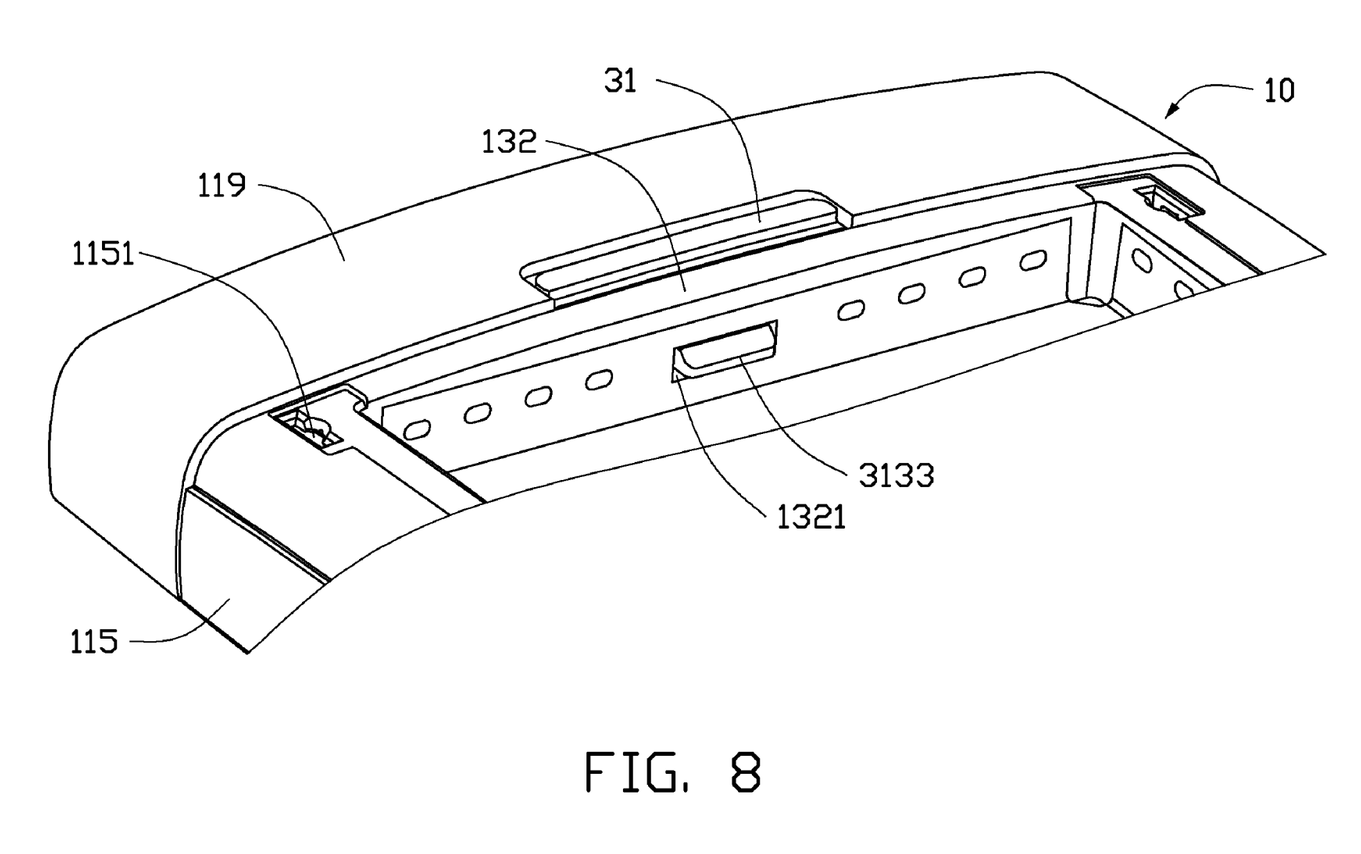
FIG. 8 is an isometric view showing the operating element and the ejecting elements attached to the base.
Figure 9:
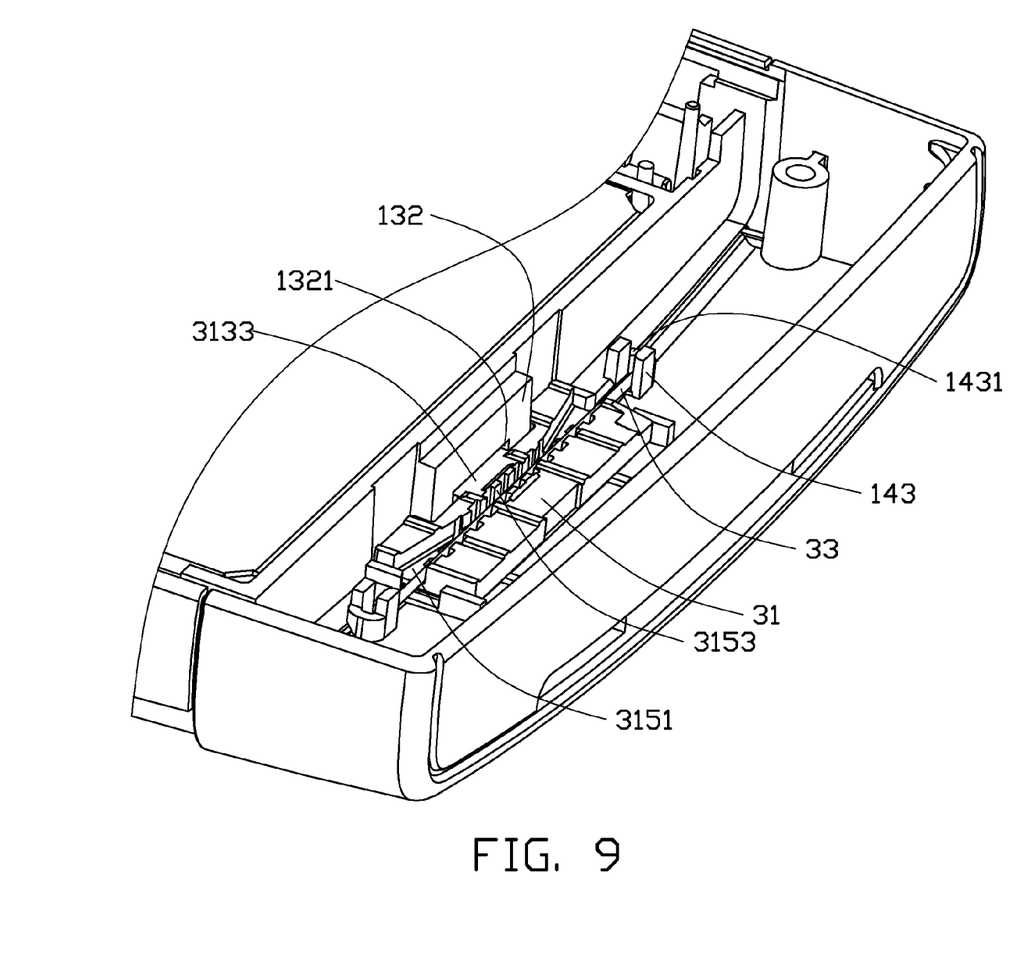
FIG. 9 is similar to FIG. 8, but viewed from another aspect.

During assembly of the portable electronic device 100, the latching element 35 is fixed to the cover 50, as shown in FIG. 7. In the exemplary embodiment, the latching element 35 is fixed to the cover 50 by laser melting. The two ejecting elements 37 are each respectively received in a corresponding chamber 1153 and the pins 373 extend upwards from the base 10, as shown in FIG. 8. The operating element 31 is received in the through hole 131. The elastic element 33 is received in the slit 3151 and both ends of the elastic element 33 are received in the slot 1431 such that the latching protrusion 3133 is slidably received in the receiving hole 1321 and extends into the battery compartment 111 as shown in FIG. 9.

Figure 10:
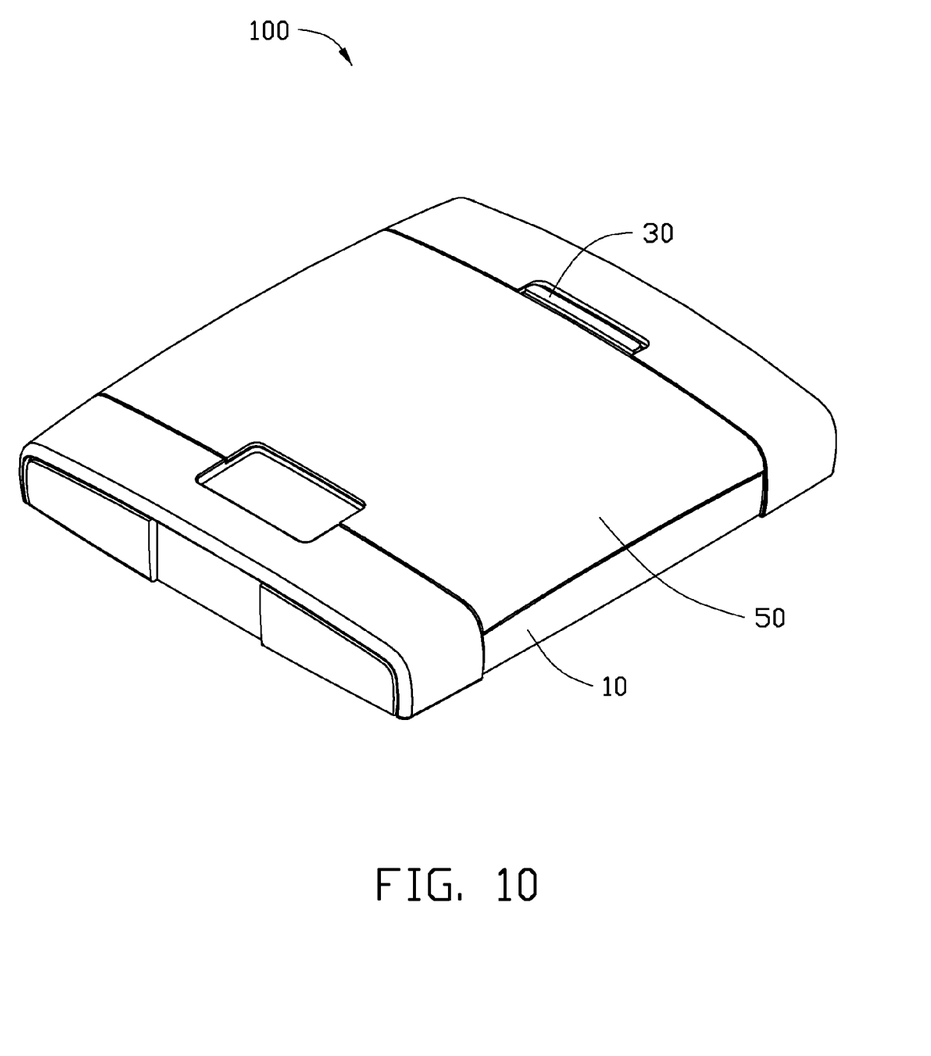
FIG. 10 is an isometric view showing the portable electronic device in a closed state.

The first latching arms 355 are each received in a corresponding aperture 1171, and bias the cover 50 such that the flange 353 of the latching element 35 abuts the latching protrusion 3133 to move the operating element 35 away from the battery compartment 111, and the operating element 35 resists and deforms the elastic element 33. When further moved towards the batter compartment 111, the cover 30 ultimately latches to the base 10. The latching protrusion 3133 is received in the latching hole 3531 by the elastic force of the elastic element 33, and the two second latching arms 357 are each received in a corresponding opening 1151. The pins 373 of the ejecting elements 37 resist the flange 353, such that the portable electronic device 100 is assembled, as shown in FIG. 10.

Figure 11:
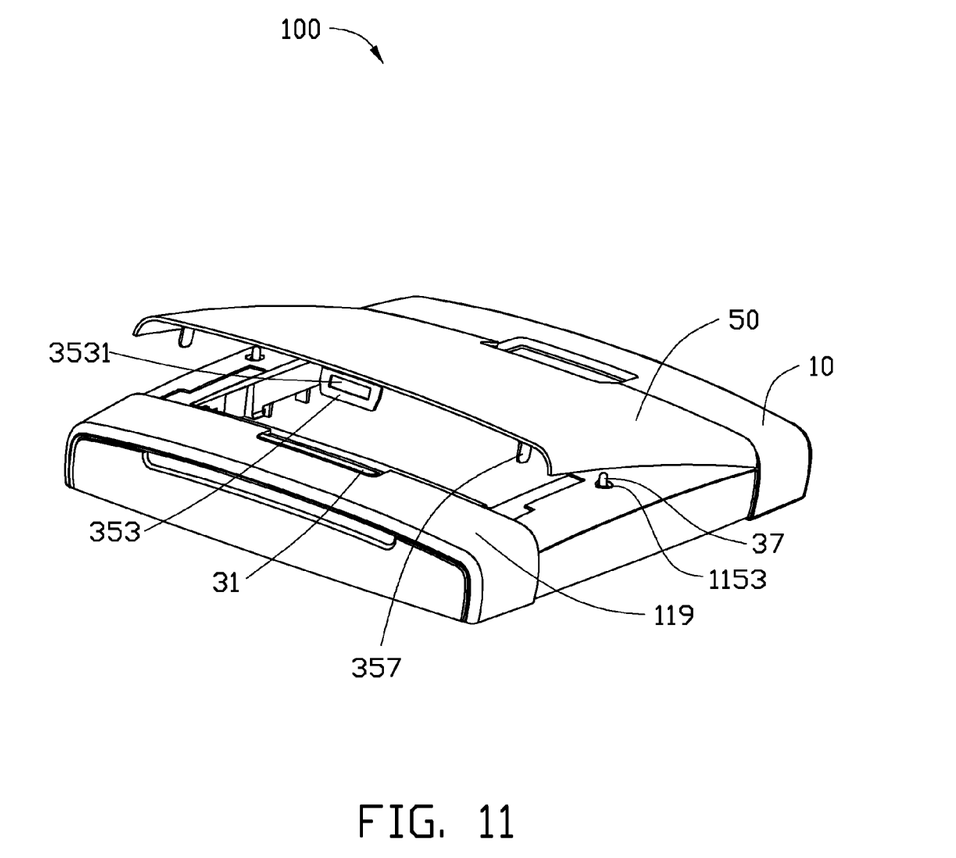
FIG. 11 is similar to FIG. 10, but showing the portable electronic device in an open state.

Referring to FIG. 11, when the cover 50 is to be removed, e.g., when the battery is to be replaced, the protrusion 3111 is moved to force the operating element 31 away from the cover 50. The operating element 31 abuts and deforms the elastic element 33, and the latching protrusion 3133 separates from the latching hole 3531. The elastic force of the pins 373 bias the cover 50 away from the base 10. Operating element 31 returns to its normal state by the elastic force of the elastic element 33 when released.

It is notable that the number of ejecting elements 37 is not limited to two, and the elastic element 33 can be attached to the operating element 31 using a through hole or formed integrally by insert-molding. Furthermore, the end of the cover 50 distant from the operating element 31 can be pivotably attached to the base 10 by a hinge or pin.

The portable electronic device 100 provides ejecting element 37 resisting the latching element 35, to force the cover 50 to attach, thus, it is easy to use.

It is believed that the present embodiments and their advantages will be understood from the foregoing description, and it will be apparent that various changes may be made thereto without departing from the spirit and scope of the disclose or sacrificing all of its material advantages, the examples hereinbefore described merely being preferred or exemplary embodiments of the disclose.

What is claimed is:

1. A portable electronic device comprising:
a base defining a battery compartment to receive a battery;
a cover covering the battery compartment and detachably attached to the base;
a latching module comprising an operating element slidably attached to the base, a latching element attached to the cover, and two ejecting elements attached to the base, the ejecting elements resisting the latching element to separate the cover from the base;
wherein the latching element forms two first latching arms and two second latching arms, the base defines two openings and two apertures; each of the first latching arms is received in the corresponding aperture, each of the second latching arms is received in the corresponding opening.

2. The portable electronic device as claimed in claim 1, wherein the ejecting elements each include a sleeve and a pin with one end of the pin slidably received in the sleeve and the other end of the pin extending out from the sleeve.

3. The portable electronic device as claimed in claim 1, wherein the base defines a through hole and forms a supporting wall defining a receiving hole, the receiving hole allowing the through hole to communicate with the battery compartment, and the operating element forms a latching protrusion comprising a flange defining a latching hole, in which the latching protrusion is received after passing through the receiving hole.

4. The portable electronic device as claimed in claim 1, further comprising an elastic element attached to the operating element and fixed in the base, the elastic element biasing the operating element toward selectively latching with the latching element or separating therefrom.

5. The portable electronic device as claimed in claim 4, wherein the elastic element is received in a curved slit defined in the operating element.

6. The portable electronic device as claimed in claim 5, wherein the base further forms two positioning portions each comprising a rib adjacent to the through hole and a block defining a slot, and each of the ribs defines a cutout, and the elastic element is received in the slots and the cutouts.

7. A portable electronic device comprising:
a base defining a battery compartment;
a cover covering the battery compartment and rotatably attached to the base;
an operating element slidably attached to the base;
an elastic rod including two opposite ends and a middle portion, the middle portion attached to the operating element, the opposite ends fixed in the base;
a latching element attached to the cover; and
an ejecting element attached to the base;
wherein the ejecting element resists the latching element to force the cover to separate from the base when detaching, the operating element is moved to deform the elastic rod and selectively latch with the latching element or separate therefrom.

8. The portable electronic device as claimed in claim 7, wherein the ejecting element includes a sleeve and a pin, wherein one end of the pin is slidably received in the sleeve and the other end of the pin extends out from the sleeve.

9. The portable electronic device as claimed in claim 7, wherein the base defines a through hole and forms a supporting wall defining a receiving hole, the receiving hole allowing the through hole to communicate with the battery compartment, and the operating element forms a latching protrusion comprising a flange defining a latching hole, in which the latching protrusion is received after passing through the receiving hole.

10. The portable electronic device as claimed in claim 7, wherein the elastic rod is received in a curved slit defined by the operating element.

11. The portable electronic device as claimed in claim 10, wherein the base further forms two positioning portions each comprising a rib adjacent to the through hole and a block defining a slot, each of the ribs defining a cutout, wherein the elastic rod is received in the slots and the cutouts.

12. The portable electronic device as claimed in claim 7, wherein the latching element forms two latching arms, the base defines two apertures, and each of the latching arms is received in a corresponding aperture.

13. A portable electronic device comprising:
a base defining a battery compartment;
a cover covering the battery compartment and rotatably attached to the base;
an operating element slidably attached to the base;
a latching element attached to the cover;
an elastic element attached to the operating element and fixed in the base, the elastic element forcing the operating element to seletively latch with the latching element or separate therefrom; and
an ejecting element attached to the base;
wherein the elastic element is received in a curved slit defined by the operating element, the ejecting element resists the latching element to force the cover to separate from the base when detaching.

14. The portable electronic device as claimed in claim 13, wherein the base further forms two positioning portions each comprising a rib adjacent to the through hole and a block defining a slot, each of the ribs defining a cutout, wherein the elastic element is received in the slots and the cutouts.

15. The portable electronic device as claimed in claim 13, wherein the latching element forms two first latching arms and two second latching arms, the base defines two openings and two apertures; each of the first latching arms is received in the corresponding aperture, each of the second latching arms is received in the corresponding opening.

* * * * *